US007001560B2

(12) United States Patent
Adachi et al.

(10) Patent No.: US 7,001,560 B2
(45) Date of Patent: Feb. 21, 2006

(54) MOLDING RESIN COMPOSITION AND METHOD OF MOLDING

(75) Inventors: Minoru Adachi, Nara (JP); Shoji Uesugi, Ikoma (JP)

(73) Assignee: Cluster Technology Co., Ltd., (JP)

( * ) Notice: Subject to any disclaimer, the term of this patent is extended or adjusted under 35 U.S.C. 154(b) by 182 days.

(21) Appl. No.: 10/332,027

(22) PCT Filed: Jul. 2, 2001

(86) PCT No.: PCT/JP01/05729

§ 371 (c)(1),
(2), (4) Date: Jan. 2, 2003

(87) PCT Pub. No.: WO02/02697

PCT Pub. Date: Jan. 10, 2002

(65) Prior Publication Data

US 2003/0109635 A1    Jun. 12, 2003

(30) Foreign Application Priority Data

Jul. 3, 2000    (JP)    ............................. 2000-201564

(51) Int. Cl.
*B28B 5/00*    (2006.01)
*C08L 61/26*    (2006.01)
*C08L 63/04*    (2006.01)

(52) U.S. Cl. ...................... 264/250; 525/423; 525/424; 525/425; 525/428; 525/429; 525/438; 525/440; 525/442; 525/443; 525/444; 525/452; 525/481; 525/495; 525/501; 525/528; 525/533; 525/535

(58) Field of Classification Search ................ 264/308, 264/328.2, 328.16, 331.11; 525/490
See application file for complete search history.

(56) References Cited

U.S. PATENT DOCUMENTS

| | | | | |
|---|---|---|---|---|
| 5,312,866 A | * | 5/1994 | Tsutsumi et al. | ............ 524/600 |
| 5,403,655 A | * | 4/1995 | Deviney et al. | .......... 428/319.7 |
| 5,432,227 A | * | 7/1995 | Fujimura | ..................... 524/508 |
| 5,750,597 A | * | 5/1998 | Waitkus | ....................... 524/35 |
| 6,342,547 B1 | * | 1/2002 | Mimura et al. | ............. 523/443 |

FOREIGN PATENT DOCUMENTS

| | | | | |
|---|---|---|---|---|
| JP | 57039925 A | * | 3/1982 | |
| JP | 59-1526 | | 1/1984 | |
| JP | 59058018 A | * | 4/1984 | |
| JP | 59098861 A | * | 6/1984 | |
| JP | 04339658 A | * | 11/1992 | |
| JP | 06128455 A | * | 5/1994 | |
| JP | 8-74904 | | 3/1996 | |
| JP | 08267738 A | * | 10/1996 | |
| JP | 9-40859 | | 2/1997 | |
| JP | 11-4081 | | 1/1999 | |
| JP | 11-60897 | | 3/1999 | |
| JP | 11060897 A | * | 3/1999 | |
| JP | 11-310666 | | 11/1999 | |

* cited by examiner

*Primary Examiner*—Robert Sellers
(74) *Attorney, Agent, or Firm*—Jagtiani + Guttag

(57) ABSTRACT

The present invention provides a resin composition suitable for molding a microscopic structure that has small cure shrinkage, good mold transfer properties and excellent properties for post-processing such as polishing processing and laser processing. Such a resin is a thermosetting resin composition comprising 95 to 35 wt % of a thermosetting resin and 5 to 65 wt % of organic filler having a particle size of 10 $\mu$m or less. From such a resin, an ink ejecting apparatus having a microscopic structure, for example, a nozzle of a diameter of 30 $\mu$m, is integrally molded.

6 Claims, 5 Drawing Sheets

MOLDING RESIN COMPOSITION AND METHOD OF MOLDING

TECHNICAL FIELD

The present invention relates to a resin composition suitable for molding, for example, a liquid ejecting apparatus having a precise and microscopic structure, such as a micro-pump, a micropipetter or an inkjet head.

BACKGROUND ART

As research on medical and biochemical research fields, especially gene therapy or genetic engineering, has made progress, mixing a very small amount of reagents has been increasingly required. Therefore, dispensing methods are required to be shifted from conventional syringe methods to methods in which a very small amount of droplets can be dispensed.

Furthermore, in the field of inkjet printers, there is a demand for high quality and high speed printing, so that the need for highly integrated inkjet heads having a narrow nozzle pitch has increased. Therefore, various droplet ejecting apparatuses having a micro-channel structure to which a micromachining technique such as LIGA process, etching and micro-pressing is applied have been devised and put to practice.

A molding resin material used for producing such an apparatus is required to have small shrinkage so that near-net-shape processing is possible, have flowability that allows molding a precise microscopic structure, and have chemical resistance.

However, at present, resins commonly used as molding resin material are thermoplastic resins, which have a large thermal expansion coefficient so that after injection forming, shrinkage occurs in the mold, and near-net-shape forming is not achieved. Therefore, in order to obtain a desired thermal expansion coefficient or shrinkage ratio, a method of adding inorganic fillers such as glass fibers to the resin was examined. However, when a resin composition containing inorganic fillers is used to mold a precision component, the precision component cannot be processed uniformly after the molding. In other words, since the hardness of the resin, which is the main component, is very different from that of the glass fibers which are the inorganic fillers, roughness tends to occur at the time of polishing. Furthermore, the maximum absorption wavelength of laser light of the resin is very different from that of the glass fibers, so that some portions are unprocessed during laser processing, and therefore precise finishing cannot be achieved.

Therefore, there is a need for a resin composition suitable for molding microscopic structures. That is, there is a need for a resin composition for molding having small shrinkage ratio, good mold transfer properties and excellent properties for post-processing such as polishing processing or laser processing.

DISCLOSURE OF INVENTION

The inventors of the present invention conducted research to solve the above-described problems and found that a desired resin composition suitable for molding a microscopic structure can be obtained by mixing a specific amount of an organic filler having a specific particle size to a thermosetting resin and thus achieved the present invention.

The present invention provides a thermosetting resin composition comprising 95 to 35 percent by weight (wt %) of a thermosetting resin and 5 to 65 wt % of an organic filler having a particle size of 10 $\mu$m or less.

In one preferable embodiment, the thermosetting resin is selected from the group consisting of epoxy resin, phenol resin, polyester resin, polyimide resin, urea resin, melamine resin and guanamine resin.

In another preferable embodiment, the organic filler is a spherical or irregular shaped powder selected from the group consisting of unsaturated polyester, phenol resin, guanamine resin, melamine resin, polyetheretherketone, polysulfone, polyethersulfone and polyimide resin.

The present invention can provide a molding resin having small cure shrinkage, good mold transfer properties and excellent properties for post-processing such as polishing processing or laser processing.

Furthermore, the present invention provides a method for producing a molded structure having a microscopic structure comprising introducing any one of the above-described thermosetting resin compositions to a mold, and heating the mold.

Furthermore, the present invention provides a method for producing a molded structure having a microscopic structure by integral molding three-dimensionally with the same resin, the method comprising: introducing the above-described thermosetting resin composition to a mold; heating the mold; and molding the obtained molded article integrally with another molded article that was molded with a different mold.

Furthermore, the present invention provides a molded structure having a microscopic structure obtained by integrally molding any one of the above-described thermosetting resin compositions.

In one preferable embodiment, the molded structure is an ink ejecting apparatus.

Furthermore, the present invention provides a method for producing an ink ejecting apparatus comprising: introducing the thermosetting resin composition to a mold of a nozzle chamber plate; heating the mold so as to mold a nozzle chamber plate in which a nozzle having a hole size of 500 $\mu$m or less can be formed; molding a vibration plate with the thermosetting resin composition; and molding integrally the obtained nozzle chamber plate and the obtained vibration plate.

In one preferable embodiment, the method includes forming nozzle holes of the nozzle chamber plate and then molding integrally with the vibration plate.

BEST MODE FOR CARRYING OUT THE INVENTION

Figure 1:
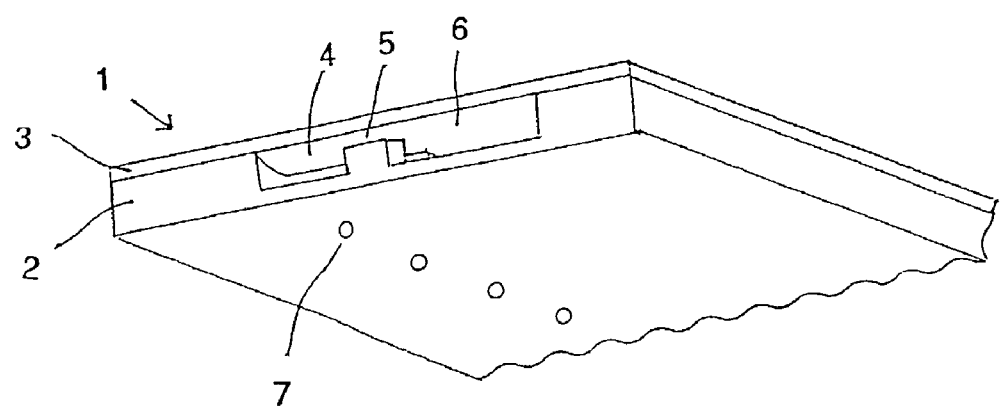
FIG. 1 is a perspective view of an ink ejecting apparatus when viewed from the side of the lower surface.

A thermosetting resin used in the present invention can be any resin, as long as it can be cured by heat. Examples thereof include, but are not limited to, epoxy resin, phenol resin, polyester resin, and polyimide resin. Epoxy resin is preferable.

There is no particular limitation regarding the organic filler used in the present invention. Any organic filler can be used, as long as it is not melted at a temperature at which a thermosetting resin is cured. Preferably, unsaturated polyester, phenol resin, guanamine resin, melamine resin, polyetheretherketone, polysulfone, polyethersulfone, and polyimide resin can be used. Guanamine resin is preferable.

The organic filler is added for the purpose of adjusting the viscosity and/or the linear expansion coefficient of a thermosetting resin composition to reduce cure shrinkage or adjusting the absorbance of laser light, and serves as aggregate when molding. In order to achieve these purposes, it is preferable that the organic filler is in the form of spherical particles or irregular shaped powder having a size of 10 $\mu$m or less. In the case of irregular shaped powder, the largest diameter can be 10 $\mu$m or less. When it exceeds 10 $\mu$m, it tends to be difficult to adjust the viscosity or the linear expansion coefficient of the thermosetting resin. A preferable particle size is generally 0.5 to 10 $\mu$m, and more preferably 1 to 5 $\mu$m, but the particle size can be determined in view of the viscosity and the linear expansion coefficient, depending on the microscopic structure to be molded.

When using an epoxy resin as the thermosetting resin and a guanamine resin as the organic filler, the thermal expansion coefficient of the composition is 2 to $7 \times 10^{-5}$, preferably 5 to $6 \times 10^{-5}$, and the cure shrinkage ratio is preferably 0.8% or less.

The organic filler is contained at 5 to 65 wt % in the thermosetting resin composition. When it is less than 5 wt %, the function as the aggregate is deteriorated, which may cause a problem regarding the strength of a molded article and may cause curvature or deformation. When it exceeds 65 wt %, the flowability of the resin composition is deteriorated, which makes it difficult to fill the resin composition into a fine portion of a mold.

The thermosetting resin composition of the present invention may contain a component used by those skilled in the art such as a releasing agent in a range that does not inhibit the purpose or the advantages of the present invention.

The thermosetting resin composition of the present invention can be used for producing general resin molded articles, but in particular, it can be used preferably in the field of precision molding such as integral molding of a molded structure having a microscopic structure.

Examples of the molded structure having a microscopic structure referred to in the present invention include various precision apparatuses in the micromachining field. For example, an ink ejecting apparatus for an inkjet printer, which is best known as a droplet ejecting apparatus, an apparatus for ejecting a very small amount of droplets or the like are included.

"Microscopic structure" refers to a structure of several microns to 500 $\mu$m, for example, a pin structure, a nozzle, or a gap. "Micro-opening" refers to an opening (regardless of the shape) having a size of about 10 to 200 $\mu$m, preferably about 30 to 100 $\mu$m.

Hereinafter, a molded structure having a micro-opening and production of the molded structure by three-dimensionally integral molding will be described by taking molding of an ink ejecting apparatus for an inkjet printer (which may be referred to simply as "ejecting apparatus" in the following) as an example.

First, an outline for producing an ink ejecting apparatus of the present invention will be described. The method includes the steps of: introducing a thermosetting resin composition to a mold of a nozzle chamber plate; heating the mold so as to mold a nozzle chamber plate in which a nozzle having a hole size of 500 $\mu$m or less can be formed; molding a vibration plate with a thermosetting resin composition (preferably the same resin composition); and integrally molding the obtained nozzle chamber plate and the vibration plate.

The nozzle chamber plate and the vibration plate can be formed one after another regardless of the order, or can be formed at the same time. The nozzle holes of the nozzle chamber plate can be formed before being molded integrally with the vibration plate, or can be formed after the integral molding, but preferably before the integral molding.

Hereinafter, the method will be described with reference to the accompanying drawings. FIG. 1 is a perspective view of an ejecting apparatus 1 when viewed from the side of the lower surface. In the ejecting apparatus 1, a nozzle chamber plate 2 and a vibration plate 3 on the nozzle chamber plate 2 are arranged, and thus a discrete ink compartment 4, a discrete ink channel 5, and a common ink channel 6 are defined. Nozzles 7 are provided on the lower surface of the nozzle chamber plate 2, corresponding to each discrete ink chamber 4. The nozzles 7 generally have a size of 30 to 100 $\mu$m.

Figure 2:
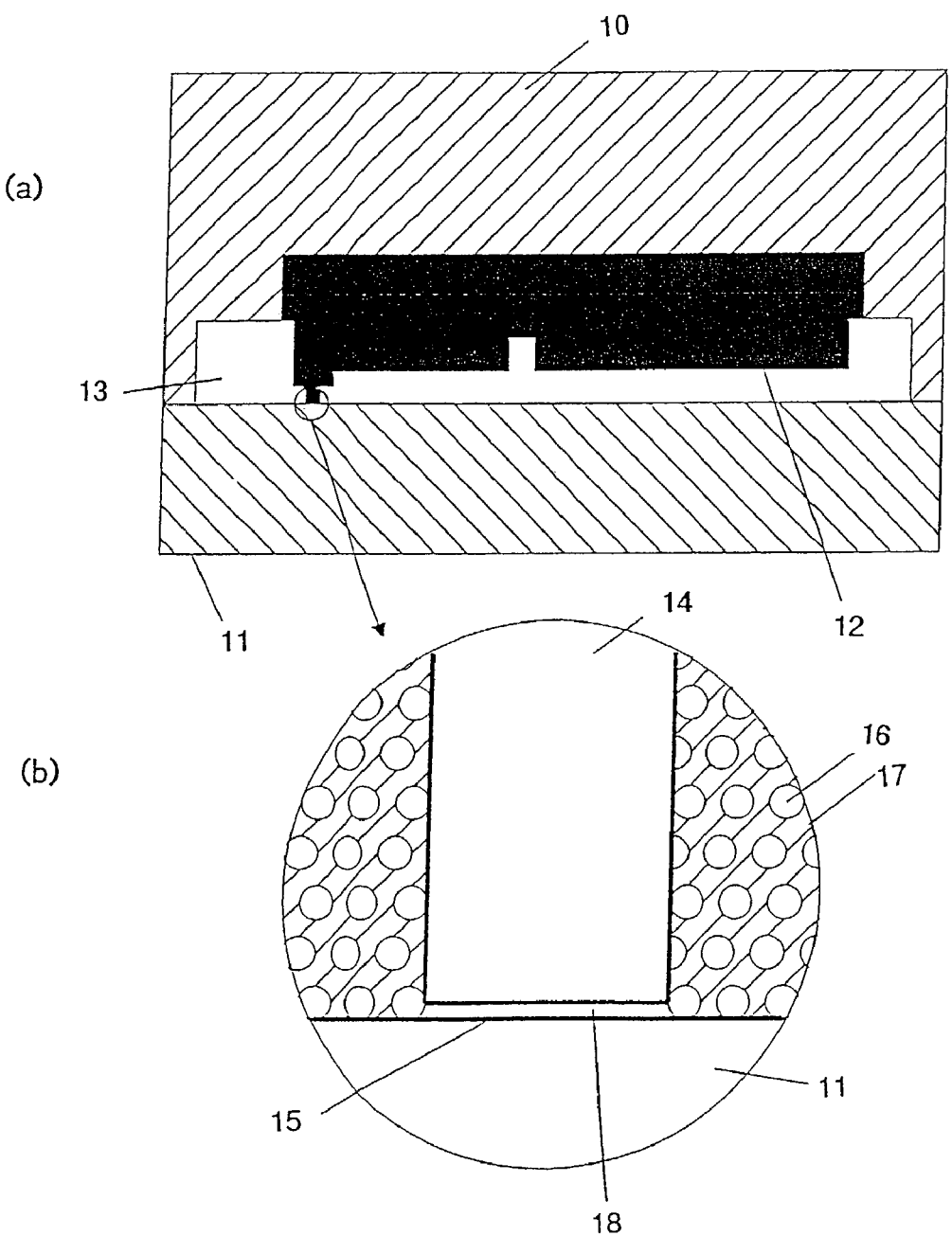
FIG. 2 is a cross-sectional view of a mold for molding a nozzle chamber plate.

In order to produce such a nozzle chamber plate 2, for example, a mold as shown in FIG. 2 is used. The mold shown in FIG. 2(a) includes an upper mold 10, a lower mold 11 and a molding piece 12. The molding piece 12 includes a number of pins with 30 to 100 $\mu$m diameter constituting the nozzles 7 of the nozzle chamber plate 2. FIG. 2(b) is an enlarged view of the vicinity of the boundary of the molding piece 12 and the lower mold 11. The pins 14 of the molding piece 12 are spaced away from the upper surface 15 of the lower mold 11 by a gap 18. This gap is formed in order to prevent the pins 14 from being bent or damaged by coming into contact with the upper surface 15 of the lower mold 11. It is preferable that this gap 18 is 1 to 100 $\mu$m.

The molding piece 12 is produced so as to have fine pins by using a LIGA process, discharge processing, cutting processing or a combination thereof.

The thermosetting resin composition is injected into a space 13 defined by the upper mold 10, the lower mold 11 and the molding piece 12 and is heated so that the thermosetting resin is cured and the chamber plate 2 provided with the nozzles 7 closed by a thin film(plate) is molded. It is preferable that the gap 18 is smaller than the particle size of the organic filler 16. This is because the organic filler prevents or reduces the penetration of the thermosetting resin 17 from the gap 18, and therefore the post-processes for letting the nozzles 7 appear (e.g., polishing processing and laser processing) can be performed easily.

Figure 3:
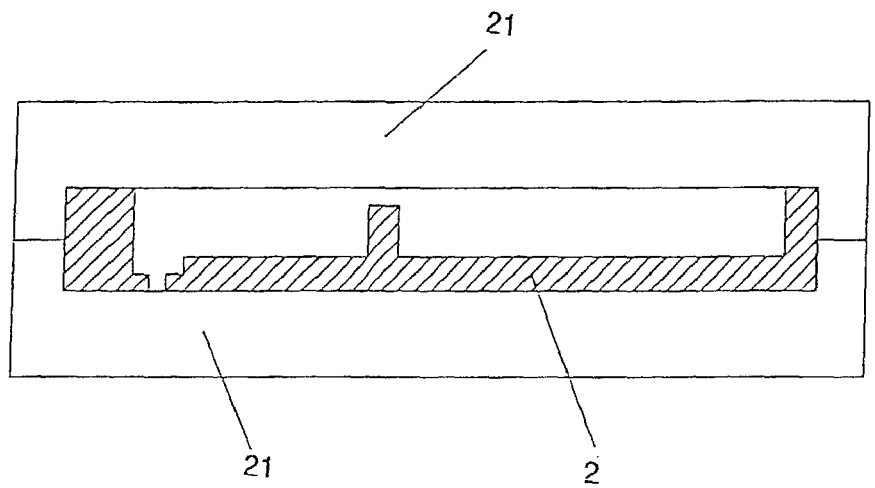
FIG. 3 is a view that shows a curing after molding.

FIG. 3 shows that the nozzle chamber plate 2 is placed in a cassette 21 for curing in order to obtain a smooth surface of the nozzle chamber plate 2 and stabilize the texture. Curing is performed at an appropriate temperature (e.g., 150 to 200° C.) for an appropriate time (3 to 8 hours) while heating.

After the curing, the nozzle chamber plate 2 is subjected to a polishing treatment or laser processing, so that a nozzle chamber plate 2 having open nozzles can be obtained.

Figure 4:
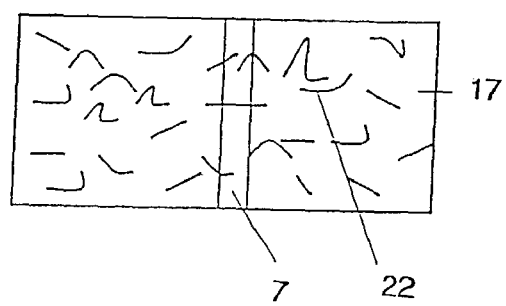
FIG. 4 is a view showing excimer laser processing of a conventional molded article containing glass fibers.
Figure 5:
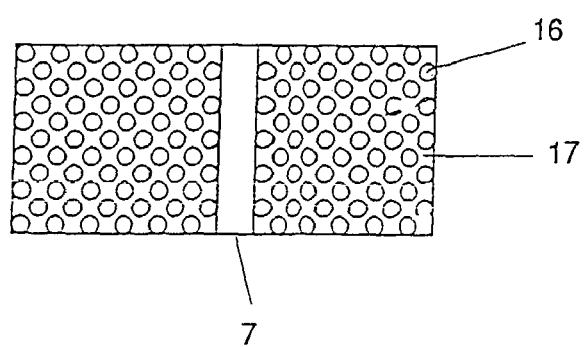
FIG. 5 is a view showing excimer laser processing of the molded article of the present invention.
Figure 6:
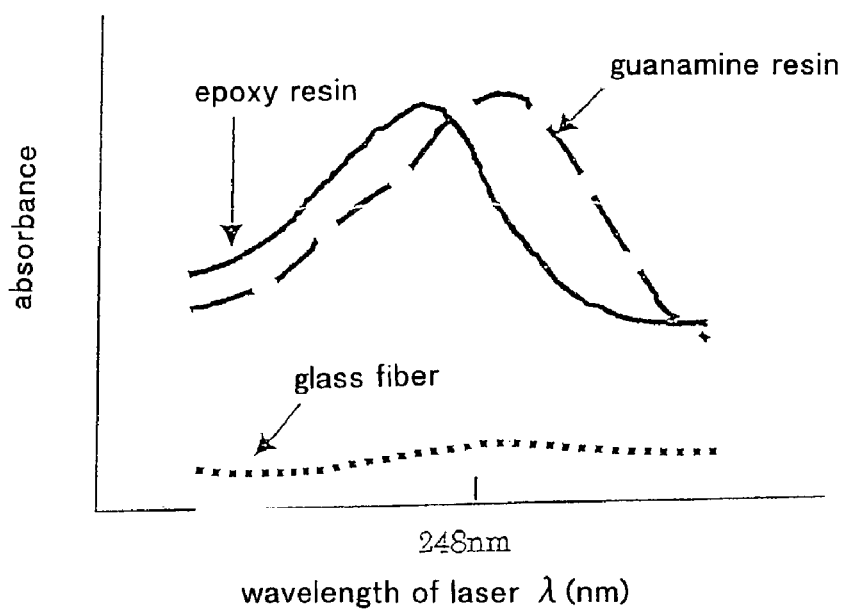
FIG. 6 is a graph showing the relationship between the wavelength and the absorbance of each material.

FIG. 4 is a schematic view showing the results of subjecting a conventional resin containing glass fibers to an excimer laser treatment. The resin is melted by the excimer laser treatment and the nozzles 7 are formed. However, glass fibers 22 remain in the channel and inhibit liquid flow. On the other hand, as shown in FIG. 5, in a molded article obtained by the present invention, nozzles 7 having a smooth surface are formed, and the resin does not remain. The reason for this seems to be as follows. As shown in FIG. 6, the absorbance at a certain wavelength of the epoxy resin is very different from that of the glass fibers. Therefore, the glass fibers cannot be melted. On the other hand, as shown in an example where a guanamine resin is used as the organic filler, since the wavelength for maximum absorption of the epoxy resin is very close to that of the guanamine resin, both the epoxy resin and the guanamine resin can be melted by a laser light. Furthermore, since the resin to be removed in the fine opening portion obtained by the present invention is very thin as described, it can be removed efficiently.

The obtained nozzle chamber plate 2 is subjected to a surface treatment with a plasma asher in order to increase the wettability of the channel and bonding ability to the vibration plate.

Figure 7:
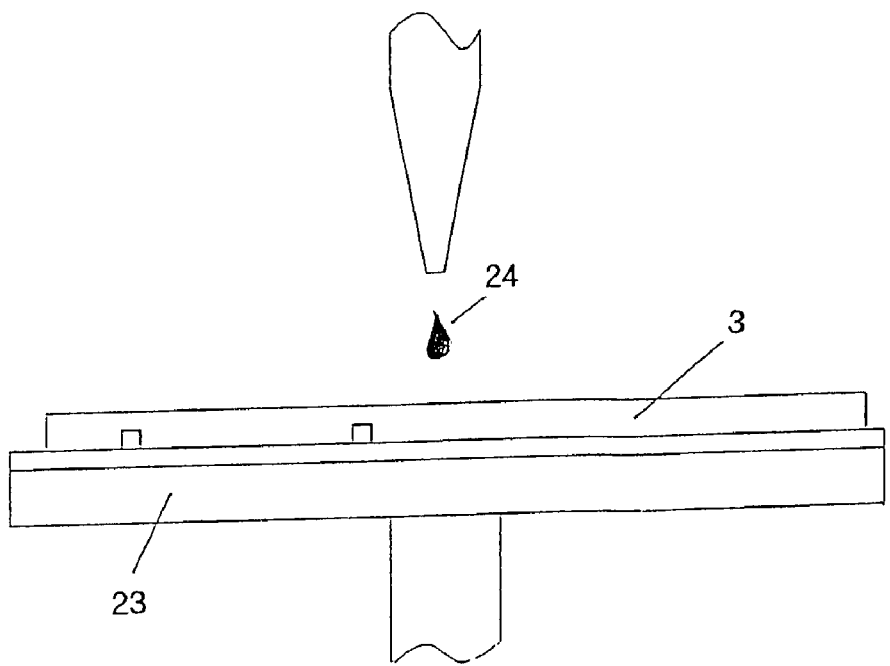
FIG. 7 is a view showing a method for applying varnish.
Figure 8:
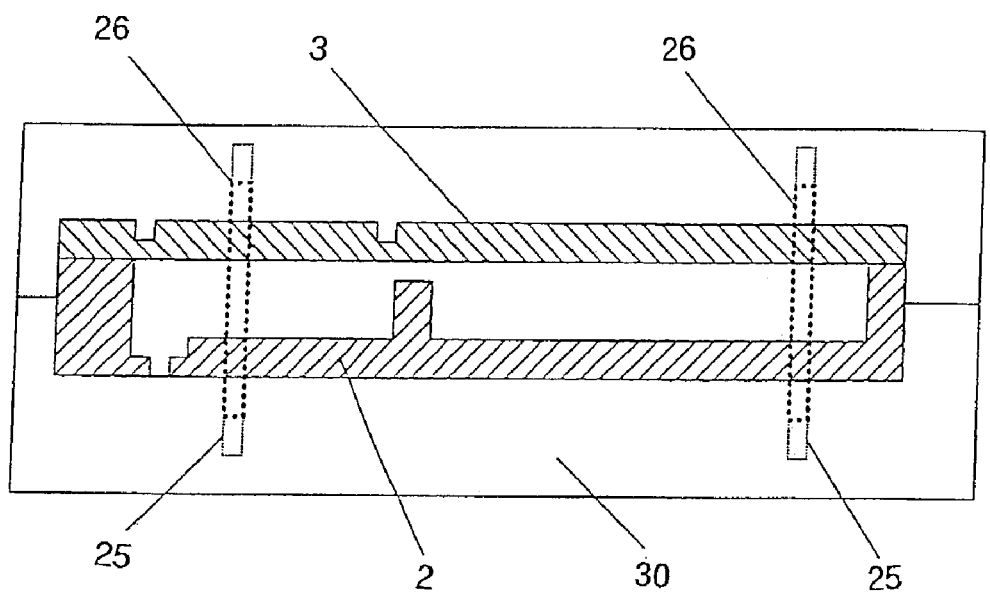
FIG. 8 is a view showing a method for joining a vibration plate and a nozzle chamber plate.

On the other hand, the vibration plate 3 molded with the same thermosetting resin composition in the same manner as for the nozzle chamber plate 2 is placed on a stage 23, as shown in FIG. 7. Then, while the stage is rotated at an appropriate number of rotations per minute, for example, 1000 to 2000 rpm, a few drops of the varnish 24 having the same components as those of the chamber plate 2 (e.g., phenolic novolak-type epoxy resin) are applied, and then a solvent is evaporated at an appropriate temperature (e.g., 60° C. to 80° C.) and dried. Therefore, as shown in FIG. 8, reference pins 26 are passed through reference holes 25 of the vibration plate 3 and the nozzle chamber plate 2, and they are placed in a cassette 30 and bonded at an appropriate temperature (e.g., 150 to 180° C.) for appropriate time (e.g., 10 to 30 minutes) for curing.

Positioning before the joining can be performed with transmitted light. Alternatively, spot joining can be performed with an iron having a heated head for temporary bonding.

In this manner, the three-dimensionally integrally molded ink ejecting apparatus 1 comprising the nozzles 7, the discrete ink chamber 4, the discrete ink channel 5 and the common ink channel 6 can be obtained.

Furthermore, if a method for joining molded articles by bonding inside the mold is used, various kinds of precision equipment in the micromachining field such as an ink ejecting apparatus can be produced easily and inexpensively.

In the above description, the parenthesized temperatures, time and the like are examples for the case where an epoxy resin is used as the thermosetting resin and a guanamine resin is used as the organic filler particles.

EXAMPLE

Hereinafter, the present invention will be described by way of example, but the present invention is not limited by this example.

Production of Nozzle Chamber Plate

Epicron N770 (manufactured by Dainippon Ink & Chemical Inc.), a phenolic type curing agent TD2106 (manufactured by Dainippon Ink & Chemical Inc.) and a curing accelerator of an imidazole based compound were mixed for a reaction, and thus a phenolic novolak type epoxy resin was obtained. Then, 40 wt % of the phenolic novolak type epoxy resin, 57 wt % of a guanamine resin (benzoguanamine resin Epostar M30 manufactured by Nippon Catalyst K.K.) having a particle size of 3 $\mu$m, and 3 wt % of metallic soap of a stearate serving as a releasing agent were mixed so as to prepare a thermosetting resin composition. The thermal expansion coefficient of this resin composition was $6 \times 10^{-5}$, and the cure shrinkage ratio was 0.78%. A mixture obtained by adding 57 wt % of glass fibers instead of the guanamine resin was used as a comparative example. The resin composition of this comparative example was oriented, the thermal expansion coefficient was 2 to $5 \times 10^{-5}$, and the cure shrinkage ratio was 0.2 to 0.5%. The thermal expansion coefficient and the linear expansion coefficient was measured by a thermomechanical analysis (TMA) method, and the cure shrinkage ratio was measured according to the method of JIS K 6911.

The obtained thermosetting resin composition was injected into a mold having the molding piece shown in FIG. 2 and heated to 180° C. At this point, pins having a diameter of 30 $\mu$m were formed in the molding piece. Furthermore, since the gap 18 shown in FIG. 2 is 2 $\mu$m or less which us smaller that the organic filler particle, a nozzle chamber plate having a thin plate in the nozzle portion was obtained. This nozzle chamber plate was placed in the cassette shown in FIG. 3, and curing was performed at 180° C. for 6 hours. Then, an excimer laser processing was performed to add a channel, and thus a nozzle chamber plate including nozzles having a diameter of 30 $\mu$m was obtained.

On the other hand, in the nozzle chamber plate of the comparative example, it was confirmed by a scanning electron microscope (SEM) that the glass fibers remained in the channel.

(Ink Ejecting Apparatus for an Inkjet Printer)

A vibration plate (thickness of 300 $\mu$m) having the same size as the chamber plate was made with the same resin composition as above. The vibration plate was placed on a stage, and three varnish drops were dropped and applied thereon while the stage was rotated at 1200 rpm, and then dried at 80° C.

Then, the obtained chamber plate and the vibration plate were bonded at the reference pins while aligning the reference holes, as shown in FIG. 8, and placed in a cassette and bonded at 180° C. for 20 minutes. Thus, an integrally molded ink ejecting apparatus for an inkjet printer was obtained. When this ink ejecting apparatus was mounted in an inkjet printer and examined, it was confirmed that uniform and clear printed letters without blur were obtained.

INDUSTRIAL APPLICABILITY

The thermosetting resin composition of the present invention can provide a molded article having a precise and complex structure that could not be obtained by a conventional injection molding by employing a specific range of an inorganic filler having a specific particle size. In particular, an ink ejecting apparatus for an inkjet printer including nozzles having a diameter of about 30 $\mu$m can be integrally molded easily.

What is claimed is:

1. A method for producing an ink ejecting apparatus comprising:

introducing a thermosetting resin composition comprising 95 to 35 wt % of a thermosetting resin and 5 to 65 wt % of an organic filler having a particle size of 10 $\mu$m or less and having a thermal expansion coefficient of 2 to $7\times10^{-5}$ and a solidification contraction ratio of 0.8% or less to a mold of a nozzle chamber plate;

heating the mold so as to mold a nozzle chamber plate in which a nozzle having a hole size of 500 μm or less can be formed;

molding a vibration plate with a thermosetting resin composition comprising 95 to 35 wt % of a thermosetting resin and 5 to 65 wt % of an organic filler having a particle size of 10 μm or less and having a thermal expansion coefficient of 2 to $7\times10^{-5}$ and a solidification contraction ratio of 0.8% or less; and molding integrally the obtained nozzle chamber plate and the obtained vibration plate, to form the inkjet ejecting apparatus.

2. The method according to claim 1, wherein the thermosetting resin is selected from the group consisting of epoxy resin, phenol resin, polyester resin, polyimide resin, urea resin, melamine resin and guanamine resin.

3. The method according to claim 1, wherein the organic filler is a spherical or irregular shaped powder selected from the group consisting of unsaturated polyester, phenol resin, guanamine resin, melamine resin, polyetheretherketone, polysulfone, polyethersulfone and polyimide resin.

4. The method according to claim 1, comprising forming nozzle holes of the nozzle chamber plate and then molding integrally with the vibration plate.

5. The method according to claim 1, wherein the thermosetting resin is an epoxy resin and the organic filler having a particle size of 10 μm or less is a guanamine resin.

6. The method according to claim 5, wherein the epoxy resin is a phenol novolak based epoxy resin.

* * * * *